Patented Apr. 14, 1931

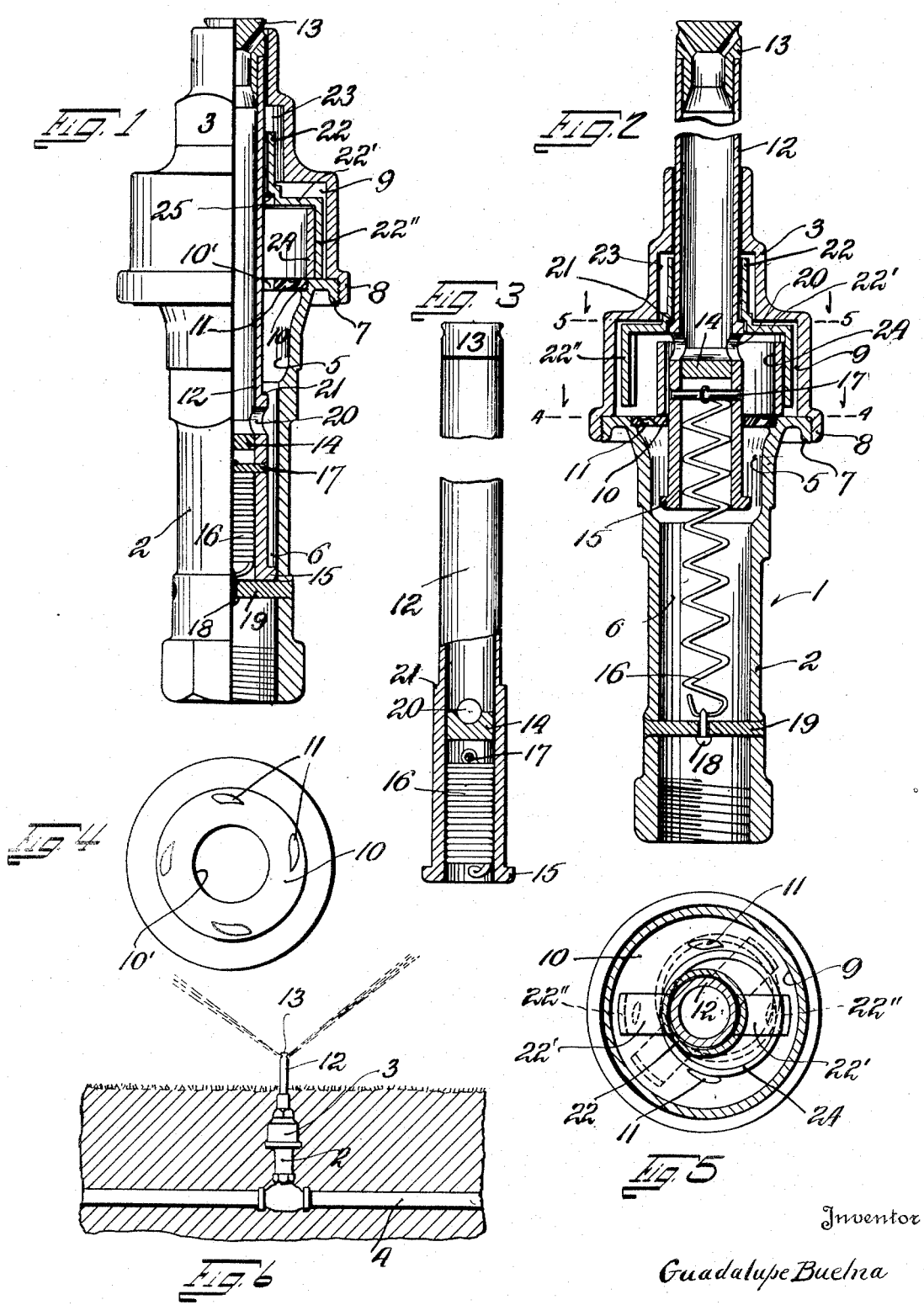

1,800,858

UNITED STATES PATENT OFFICE

GUADALUPE BUELNA, OF SANTA BARBARA, CALIFORNIA

SPRINKLER

Application filed April 1, 1929. Serial No. 351,589.

My invention relates to a water distributing means and it has particular reference to a sprinkler adapted more especially for use in watering lawns, golf links and other surfaces and to be set in operation by the passage of water therethrough.

Objects of the invention are to provide a simple sprinkling device which may be conveniently concealed below the surface to be irrigated whereby the beauty of the lawn will not be marred and the sprinkling device will not be an obstruction; to provide a sprinkler in which the nozzle or water dispersing head is elevated above the surface to be watered and maintained in elevated position, during the sprinkling, by the pressure of water; to provide a sprinkler in which the distribution of water shall occur only when the nozzle is elevated above the surface and to provide a sprinkler in which the water dispersing nozzle shall be rotated during the distribution of water.

These and other objects are accomplished by a preferred form of embodiment of the invention more particularly described in the following specification, in connection with the accompanying drawing which forms a part thereof.

In the drawing

Fig. 1 is an elevational half sectional view showing my invention the parts being in normally inoperative position.

Fig. 2 is a longitudinal section showing the parts of my invention in operative position.

Fig. 3 is a sectional elevation of the nozzle.

Fig. 4 is a plan view of the water jetting nozzle, the view being taken along line 4—4 Fig. 2 looking in the direction of the arrow.

Fig. 5 is a section on line 5—5 Fig. 2, and

Fig. 6 is an elevational view showing my sprinkler installed for use.

Generically considered, my invention consists of a sprinkler unit arranged to be placed in the ground and below the surface thereof and provided with a sprinkler member that is arranged to be projected above the ground surface by water pressure and to be intermittently rotated while thus projected. In practice, a number of the sprinkler units are connected to a source of water supply and disposed at such intervals that a complete wetting of the surface is effected, the operation of each sprinkler being automatic as soon as water or other fluid is caused to travel through the mains to which the units are connected.

In a more specific sense, and referring particularly to the form and design of the device illustrated, my invention comprises a body 1, composed preferably of two separable sections 2 and 3, the section 2 being formed at one end for threaded attachment to a water main 4, Fig. 6, and provided at the other end with an enlarged chamber 5 with which the passageway 6 in the section 2 directly communicates. The chambered end of the section 2, as shown in Figs. 1 and 2, is provided with a threaded flange 7 for connecting therewith the flange 8 provided on the bottom of an enlarged compartment 9, constituting an integral part of the section 3, and which compartment is separated from the chamber 5 by a plate 10 suitably carried by and secured in the top of said chamber. This plate is provided with a central opening 10' and with preferably equably spaced ports 11 angularly penetrating said plate for causing the water or other fluid to issue therefrom in the form of tangential jets, for purposes to be explained more fully hereinafter. Operatively disposed within the respective sections 2 and 3 of the body 1 is a pipe 12 arranged to be elevated above the ground surface, as shown in Figs. 2 and 6, by water pressure and, through a nozzle 13 carried by said pipe 12 to disperse water passing therethrough. For this purpose, the lower part of the pipe 12 constitutes substantially a piston, the elements co-operating to give this function to the lower end of the pipe being represented by a wall, plug or other member 14 inset beyond the end of said lower part and completely obstructing the passage of any fluid, and by an extension 15 at the end of said lower part which extension is of a diameter to permit an easy sliding movement within the bore 6 of the section 2 without permitting any water to escape between it and the inner wall of section 2. Thus when the pipe 12 is in the normally inoperative position shown in Fig. 1, in which position the nozzle 13 is retracted below the ground surface, and the water is turned on, the piston end of the pipe 12 within the bore 6 of the section 2, will be elevated thereby, against the tension of a spring 16, one end of which is connected to a pin 17 within the lower part of the pipe 12 and the other end of which is connected to a pin or other device 18, that is swivelled in a transverse bar 19 provided near the bottom of said lower part of the section 2. As seen in Fig. 1, when in retracted position, the piston end of the pipe 12 rests upon the transverse bar 19, and the contracted spring 16 is housed within the lower part of the pipe 12. The pipe 12, as seen in Figs. 1 and 2 extends through the opening 10' in said plate 10, which divides the chamber 5 from the compartment 9 and is operable relatively thereto and to the body 1. It is provided with lateral openings 20 intermediate its length, which openings 20, when the pipe 12 is in operative position, as shown in Fig. 2, communicate with the compartment 9 and through which the water in said compartment enters said pipe, eventually discharging through the nozzle or sprinkler head 13. From the foregoing it will be observed, that so long as the piston part of the pipe 12 is within the bore 6 of the section 2, no water can escape through the pipe. But so soon as, owing to the water pressure, the pipe 12 is elevated so that the bottom or extension 15 thereof moves past the terminus of said bore 6 and into the chamber 5, a substantial portion of the water passes into said chamber, then through the ports 11 in said plate 10 into the compartment 9 and then through the openings 20 in said pipe 12, which openings 20 are now in free communication with the compartment 9. The pressure of the water operates to maintain the pipe 12 in elevated position against the tension of the spring 16 and the dispersion of water through the nozzle 13 will continue so long as the pipe is held elevated by water pressure. When the water is shut off, the spring 16 will retract the pipe 12 to the normal position, shown in Figs. 1 and 3.

It is very desirable and most necessary for a thorough wetting of the surface that the sprinkler pipe 12 be caused to alter its position, so that the largest possible area may be watered, and it is desirable that this changing of position be continuous during the sprinkling. I have illustrated in the drawing a simple means for causing the rotation of the sprinkler pipe 12 continuously with intervals of rest, such means coming into play only when the pipe is elevated and actuable by the tangential jets of water discharging through the ports 11 in the plate 10. Referring to Figs. 1 and 2, the pipe 12 is shown provided with an annular shoulder 21, upon which is arranged to rest a collar 22, housed in a recess 23 in the section 3 of the body 1, by which it is also guided in its vertical movement. This collar 22 is provided with a lever which consists of opposed horizontal arms 22' terminating in vertical legs 22", which extend to within a short distance of the inner wall of the compartment 9, the arms 22' and legs 22" constituting substantially a lever. Loosely resting upon the plate 10 and surrounding the pipe 12 is a hollow cylindrical member 24 eccentrically disposed with relation thereto so that a portion of the inner wall thereof will be beyond at least one of the ports 11 in the plate 10, as seen in Figs. 2 and 5 and in direct line with one of the jets of water issuing tangentially from said ports. During the rotative movement of said hollow cylindrical member 24 produced by the successive impingement of the jets of water from the ports 11, said member 24 which operates within the area defined by the legs 22" of the lever periodically brushes against first one leg 22" of the lever and then against the other, and in so doing causes a rotation of the collar 22, which frictionally communicates its motion to the pipe 12, which is maintained in elevated floating position by water pressure. In order to insure a communication of the rotative movement of the collar 22 to the pipe 12, the shoulder 21 and collar 22 may be provided with mutually engaging surfaces 25, Fig. 1. As the pipe 12 is intermittently rotated, the spring 16 will also rotate with it, and the swivelling connection with the bar 19 provides for this movement of the spring. From Fig. 1 it will be seen that when the ports are in retracted position, the legs 22" of the lever will rest upon the plate 10, but when the pipe 12 is elevated as shown, in Fig. 2, the shoulder 21 thereof will engage the collar 22 and elevate it so that the legs 22" are suspended. This occurs practically at the same time that the lower part of the pipe 12 admits the water to the chamber 5.

What I claim is:

1. A sprinkler comprising a hollow body arranged for attachment at one end to a water supply and provided intermediate its length with a chamber, a sprinkler pipe having openings, means normally holding said pipe retracted within said body, said pipe having its lower portion closed and normally closing communication between said body and chamber, said closed portion acted upon by water pressure to project said pipe beyond said body, and establish communication between the bore in said body and said chamber to enable the water to be discharged from said chamber through the openings in said sprinkler pipe, means within said body to divide the water into a plurality of jets, and means acted upon by said jets and in frictional engagement with said pipe to rotate the same intermittently.

2. A sprinkler comprising a hollow body provided with an enlarged water receiving chamber and formed for attachment to a water supply, a pipe within said body having sprinkler openings and inlet openings, and provided with means normally closing communication between said body and chamber and acted upon by water pressure to project said pipe beyond said body and simultaneously establish communication between the inlets in said pipe and said chamber, a lever on said pipe, an actuator for said lever, and means for jetting water into said chamber and against said actuator while said pipe is projected thereby to provide an intermittent rotation of said pipe while the water is passing through the sprinkler openings therein.

In testimony whereof I have set my hand.

GUADALUPE BUELNA.